United States Patent [19]

Blyakhman et al.

[11] Patent Number: 5,025,095

[45] Date of Patent: Jun. 18, 1991

[54] SUBSTITUTED DIALLYLPHENOL DERIVATIVES AS REACTIVE DILUENTS FOR BISMALEIMIDES

[75] Inventors: Yefim Blyakhman, Bronx, N.Y.; Byung H. Lee, Easton, Conn.

[73] Assignee: Ciba-Geigy Corporation, Ardsley, N.Y.

[21] Appl. No.: 597,278

[22] Filed: Oct. 12, 1990

Related U.S. Application Data

[63] Continuation of Ser. No. 467,092, Jan. 18, 1990, abandoned.

[51] Int. Cl.$^5$ .............................................. C07C 43/78
[52] U.S. Cl. .................................... 568/652; 528/86; 528/154; 528/322; 568/650; 568/744; 568/780; 568/716
[58] Field of Search ............... 568/652, 650, 744, 780; 528/86, 154, 322, 716

[56] References Cited

U.S. PATENT DOCUMENTS

| | | | |
|---|---|---|---|
| 3,929,904 | 12/1975 | DeSimone et al. | 568/562 |
| 4,048,236 | 9/1977 | Nagai et al. | 568/652 |
| 4,100,140 | 7/1978 | Nahir et al. | 526/90 |
| 4,154,769 | 5/1979 | Barer et al. | 568/652 |
| 4,644,039 | 2/1987 | Boyd et al. | 525/422 |
| 4,654,407 | 3/1987 | Domeier | 526/262 |
| 4,812,511 | 3/1989 | Domeier | 524/850 |

OTHER PUBLICATIONS

Pathak et al., "Chemical Abstracts", vol. 102 (1985) 102:6019j.
Anjaneyulu et al "Chemical Abstracts", vol. 109 (1988) 109:1899j.
H. D. Stenzenberger et al., 29th Nat. Sampe, p. 1043 (1985).
Y. Yamamoto et al., 30th Nat. Sampe, p. 903 (1985).
S. J. Shaw et al., Int. J. of Adhesion and Adhesives, vol. 5, p. 123 (1985) pp. 123–127.
H. D. Stenzenberger, British Polymer J., vol. 20, p. 383 (1988).
F. C. Robertson, British Polymer J., vol. 20, p. 417 (1988).
Finska Kemistsamfundets Medol., vol. 74, No. 3, pp. 62–71 (1965).
M. Chaudhari et al., 32nd Int. Sampe Symposium, p. 24 (1987).

*Primary Examiner*—Werren B. Lone
*Attorney, Agent, or Firm*—JoAnn Villamizar

[57] ABSTRACT

Substituted diallylphenol derivatives are useful as reactive diluents for bismaleimides. Formulations comprising bismaleimides and substituted diallylphenol derivatives are particularly useful in resin transfer molding and filament winding techniques.

20 Claims, No Drawings

SUBSTITUTED DIALLYLPHENOL DERIVATIVES AS REACTIVE DILUENTS FOR BISMALEIMIDES

This application is a continuation of application Ser. No. 467,092, filed Jan. 18, 1990 abandoned.

BACKGROUND OF THE INVENTION

Addition type thermoset polyimide resins are finding increased use as matrix resins for advanced composites, adhesives and coating applications. Many different approaches have been explored to obtain resins and composites which are easy to process but better in mechanical strength and temperature resistance. The fastest growing area of addition-type polyimides is that of bismaleimides (BMI) which are synthesized by condensation of maleic anhydride with aromatic diamines and subsequent imidization. The most commonly used building block in BMI chemistry is bis(4-maleimidophenyl)methane (1):

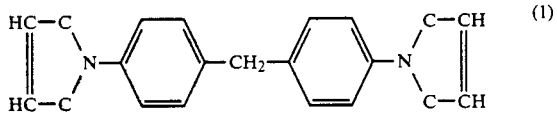

When homopolymerized, highly crosslinked and highly aromatic backbones result producing a very thermally stable but brittle matrix. Considerable formulation work has been carried out to improve the toughness and processability while retaining high temperature properties. To achieve these goals, bismaleimides have been blended and coreacted with allyl/vinyl monomers (Stenzenberger et al, 29th Nat. SAMPE, p.1043 (1985)), thermoplastics (Yamamoto et al, 30th Nat. SAMPE, p. 903 (1985)) and reactive rubbers (Shaw et al, Int. J. of Adhesion and Adhesives, Vol. 5, p. 123 (1985)). The best results have been obtained with allyl phenyl type coreactants (Stenzenberger, British Polymer J., Vol. 20, p. 383 (1988)).

One new system consists of bis(4-maleimidophenyl)methane and O,O'-diallylbisphenol A of the formula (2):

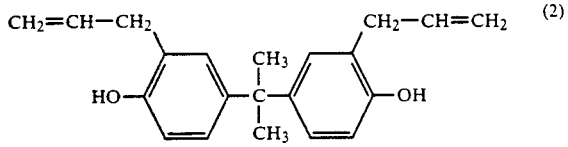

Upon heating the mixture at 110°–125° C. it forms a homogeneous prepolymer which has a low viscosity (~500 cP at 100° C.) and can be processed into prepreg and composites with the existing equipment and technology used for epoxy resins. Upon curing, a crosslinked polymer is formed which exhibits excellent high temperature properties with significant improvement in toughness. However, for the development of other significant promising techniques like resin transfer molding and/or filament winding, it is necessary to reduce the viscosity of the prepolymer and the processing temperature. Preferably, the resin should have a viscosity of 200–300 cPs at 70°–80° C. [Robertson, British Polymer J., Vol. 20, p. 417 (1988)].

Accordingly, it is an object of the present invention to provide reactive diluents which maintain the high temperature resistance and mechanical strength of the crosslinked bismaleimide based polymer.

It is a further object of the present invention to provide curable formulations comprising bismaleimides and substituted diallyl phenols exhibiting a viscosity of about 200–300 cPs at about 70°–80° C.

Various other objects and advantages of this invention will become apparent from the following description thereof.

SUMMARY OF THE INVENTION

The present invention relates to substituted diallylphenol reactive diluents for use with bismaleimides and to curable formulations comprising bismaleimides and substituted diallylphenol reactive diluents. These reactive diluents are liquids and are miscible with bismaleimides and other components of bismaleimide based formulations, forming compositions that are melt processable. Formulations comprising bismaleimides and the substituted diallylphenol reactive diluents may be useful as curable coatings, casting, adhesive and impregnating resins and are particularly useful in resin transfer molding and filament winding techniques for producing curable prepreg, laminates and composites.

DETAILED DESCRIPTION OF THE INVENTION

The present invention relates to substituted diallylphenol derivatives of the formula (I)

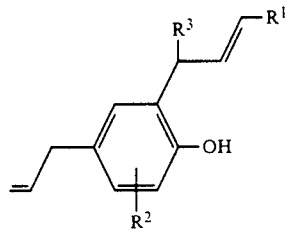

wherein $R^1$ is hydrogen, $C_1$–$C_{20}$-alkyl or aryl; $R^2$ is $C_1$–$C_{20}$-alkyl, aryl or -$OR^4$ wherein $R^4$ is $C_1$–$C_{20}$-alkyl or aryl and $R^3$ is hydrogen, $C_1$–$C_{20}$-alkyl or aryl, with the proviso that when $R^2$ is methoxy, one of $R^1$ and $R^3$ is not hydrogen.

Aryl includes phenyl, benzyl, α-naphthyl, β-naphthyl, meta- and para-methylphenyl and trifluoromethylphenyl. Preferably aryl is phenyl. Alkyl is preferably $C_1$–$C_4$-alkyl, most preferably methyl.

$R^1$ and $R^3$ are preferably hydrogen or phenyl. $R^2$ is preferably -$OR^4$ and $R^4$ is preferably $C_1$–$C_4$-alkyl and most preferably methyl.

More specifically, examples of such substituted diallylphenols include, among others, 2-α-phenylallyl-4-allyl-6-methoxyphenol, 2,4-diallylphenol, 2,4-diallyl-6-benzylphenol, 4-allyl-2-α-phenylallylphenol and 4-allyl-2-γ-phenylallylphenol.

The substituted diallylphenol derivatives can be obtained by the reaction of commercially available allylphenols with allyl chloride or its derivatives, for example, methallyl chloride, cinnamyl chloride and the like.

The reactive diluents of the present invention may be prepared by a variety of well-known methods, including reaction of an appropriate allylphenol with allyl chloride or its derivatives as exemplified in the reaction scheme below.

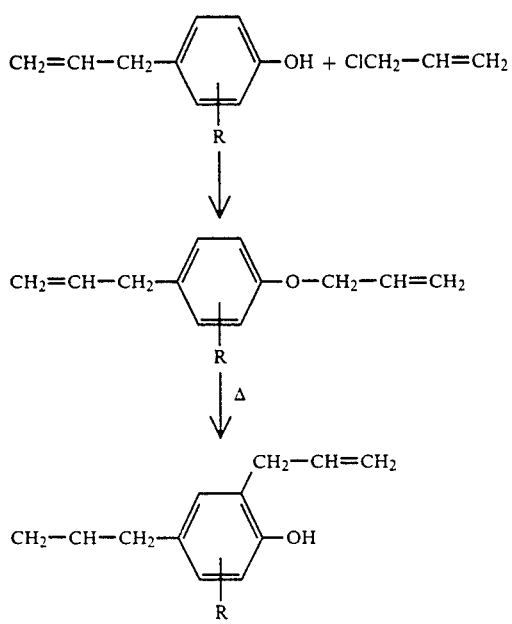

Allylphenols not readily available commercially may be obtained by well-known processes, such as from the corresponding allyl phenyl ethers by a thermal isomerization process.

The invention further relates to a bismaleimide resin formulation comprising a bismaleimide and as a reactive diluent, at least one substituted diallylphenol of formula (I)

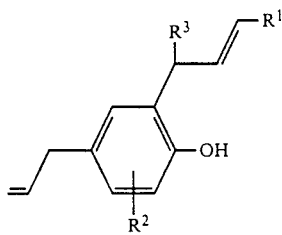

wherein $R^1$ is hydrogen, $C_1$-$C_{20}$-alkyl or aryl; $R^2$ is $C_1$-$C_{20}$-alkyl, aryl or -$OR^4$ wherein $R^4$ is $C_1$-$C_{20}$-alkyl or aryl and $R^3$ is hydrogen, $C_1$-$C_{20}$-alkyl or aryl. The preferred substituents and specific examples have been provided hereinabove. Additionally, included is 2,4-diallyl-6-methoxyphenol.

The bismaleimides useful in the formulations of this invention may be any of the bismaleimides derived from aromatic and aliphatic diamines, including any of the well-known and widely available phenylene diamines and the various diamino-substituted polynuclear aromatic compounds such as diaminodiphenyl sulfone, diaminobenzophenone, diaminodiphenylether, diaminodiphenylmethane, and the like, as well as the various aryl compounds having a plurality of aminophenylalkylidene or aminophenoxy substituents. Also useful are bismaleimides based on $C_4$-$C_{20}$ aliphatic diamines such as the various isomeric alkanes having diamino substituents. The bismaleimides may be employed singly or in mixtures comprising two or more bismaleimides, which may include both aromatic and aliphatic bismaleimides. A great variety of bismaleimides suitable for use as matrix resins are well-known in the art, such as are recited for example in U.S. Pat. Nos. 4,644,039, 4,100,140 and 4,654,407. Preferably, bis(4-maleimidophenyl) methane is employed.

The bismaleimide formulations of the present invention comprise about 50-60 parts by weight of the bismaleimide and from about 1 to about 50 parts, preferably 5 to about 25 parts, by weight of the reactive diluent. The formulations will be readily prepared by simple mixing operations ordinarily employed in the resin formulating art and may, if desired be compounded at moderately elevated temperatures to reduce the viscosity of the mixture.

The formulations may further include from 0 to about 30 wt. % based on total resin formulation, of a thermoplastic polymer such as, for example, a polyaryl ether, a polyaryl sulfone, a polyarylate, a polyamide, a polyaryl ketone, a polyimide, a polyimide-ether, a polyolefin, an ABS resin, a polydiene or diene copolymer, polycarbonate or a mixture thereof.

The formulations of the present invention may further include up to 50 wt. %, based on total resin formulation, of other reactive diluents and modifiers ordinarily employed in bismaleimide resin compositions, such as, for example, vinylic coreactants such as N-vinyl-2-pyrrolidinone, alkylene glycol vinyl ethers, vinyl toluene, styrene, divinyl benzene and the like, acrylates and methacrylates such as ethylene glycol dimethacrylate, acrylates and methacrylates of polyols such as trimethylol propane and pentaerythritol, allylic compounds such as triallyl isocyanurate, diallyl phthalate, tetraallyl pyromellitate, o,o'-diallyl bisphenol A, eugenol, aryl allyl ethers such as the diallyl ether of bisphenol A and the like. Preferably, O,O'-diallyl bisphenol A is employed. Other coreactive modifiers may also be included in the formulations of this invention, such as, for example epoxy resins, cyanate ester resins and mixtures thereof, together with appropriate curing aids and accelerators typically employed in formulating such curable compositions.

The formulations may also include 0 to 3 wt. % of one or more initiators for vinyl polymerization such as di-t-butyl peroxide, dicumyl peroxide, 1,1-bis(t-butylperoxy) cyclohexane, azo bis-isobutyronitrile, t-butyl perbenzoate, and the like. Inhibitors for vinyl polymerizations, such as hydroquinone, t-butyl hydroquinone, benzoquinone, p-methoxyphenol, phenothiazine, 4-nitro-m-cresol, and the like may also be employed in amount of from 0 to 2 wt. %.

The bismaleimide formulations of the invention are particularly useful in combination with structural fiber for producing fiber reinforced laminates and composites and for the manufacture of prepreg. The structural fibers which may be used for these purposes include carbon, graphite, glass, silicon carbide, poly(benzothiazole), poly(benzimidazole), poly(benzoxazole), aluminum, titanium, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. DuPont Company) and silicon carbide fibers, aromatic polyamide fibers. The composites will generally comprise from about 10 to about 90 wt. % fiber, based on total weight of composite.

Preimpregnated reinforcement, or prepreg, may be made by combining the resin formulations with a structural fiber, using any of the variety of methods known in the art such as wet winding, hot melt fiber impregnation or impregnation with a solvent varnish. Tacky, drapable prepreg tape or tow can be produced having a long prepreg out time at room temperature, typically one to four weeks. Alternatively fiberous preforms introduced to closed molds may be impregnated by injection of low viscosity resin compositions into the mold followed by thermal gellation, the so-called resin transfer molding technique.

The compositions of this invention may be used as matrix resins for composites, high temperature coatings and adhesives. When reinforced with structural fibers, they may be used as aircraft parts as automotive parts such as drive shafts, bumpers, and springs, and as pressure vessels, tanks and pipes. They are also suitable for use in a wide variety of sporting goods applications such as golf shafts, tennis rackets and fishing rods.

In addition to structural fibers, the composition may also contain particulate fillers such as talc, mica, calcium carbonate, aluminum trihydrate, glass microballoons, phenolic thermospheres, and carbon black. Up to half of the weight of structural fiber in the composition may be replaced by filler. Thixotropic agents such as fumed silica may also be used.

EXAMPLES

The following examples serve to give specific illustrations of the practice of this invention but they are not intended in any way to limit the scope of this invention.

EXAMPLE 1

Synthesis of 2,4-Diallyl-6-Methoxyphenol

To the solution of 162.4 g (1 mol) of 4-allyl-2-methoxyphenol (Eugenol) in 500 ml of 1-propanol heated to 70° C., 40 g (1 mol) of NaOH pellets are added and the mixture is stirred at 90° C. until NaOH is dissolved. The solution is cooled to 70° C. and 95.6 g (1.25 mol) of allyl chloride are added dropwise. After that, the reaction mixture is refluxed at 90° C. for 3 hours, then filtered, and propanol distilled off. 500 ml of toluene are added to the residue and the obtained solution is washed with 10% NaOH in water. The toluene-water mixture is distilled off and 6.5 g of LiCl and 1.6 g of $Na_2CO_3$ are added. The reaction mixture is heated to 130° C. under vacuum and kept at this temperature for 1 hour, then filtered and distilled under vacuum. The product 2,4-diallyl-6-methoxyphenol is off-white, low viscosity liquid (viscosity is 7 cPs at 25° C.) having a boiling point of 109°–112° C. (2–3 mm Hg), the structure is confirmed by IR and NMR Data. Yield is 163 g (80%).

EXAMPLE 2

Synthesis of 4-Allyl-2-α-phenylallyl-6-methoxyphenol

To the solution of 162.4 g (1 mol) of 4-allyl-2-methoxyphenol in 500 ml of 1-propanol heated to 70° C., 40 g of NaOH are added and the mixture is stirred at 90° C. until the sodium hydroxide is dissolved. To the solution 152.6 g of cinnamyl chloride are added dropwise at 70° C. and the reaction mixture is stirred at 90° C. for 4 hours. After filtration and cooling the solution, crystallization starts. Off-white crystals are filtered off and dried in a vacuum oven at 30° C. Obtained product has a melting point of 53° C., and, according to LC data, has 99% purity (structure is confirmed by IR and NMR).

70 g Of the ether are dissolved in 150 ml of toluene and 3.5 g of LiCl and 0.8 g of $Na_2CO_3$ are added. After distillation of the toluene the mixture is heated under vacuum at 190° C. for one hour. After cooling, the slurry is filtered to remove the catalysts and the filtrate is vacuum distilled-boiling point is 146°–148° C. (2 mm Hg). The distillate is recovered and the structure of the obtained product (II) is confirmed by IR and NMR.

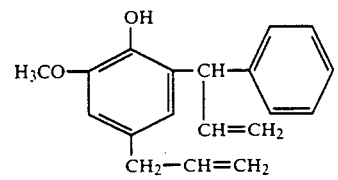

EXAMPLE 3

Synthesis of 4-Allyl-2-(γ-phenylallyl)-6-methoxyphenol. (III)

To a solution of 82.1 g (0.5 mol) of 4-allyl-2-methoxyphenol in 150 ml of methanol, 11.5 g of sodium are added. After the sodium is dissolved, 600 ml of toluene are added and methanol is distilled off. To the formed slurry 100 g of cinnamyl bromide (0.51 mol) are added dropwise at 70° C. The reaction mixture is refluxed for 6 hours, then cooled to room temperature, filtered to remove NaBr and distilled, first to remove toluene, second then under vacuum to collect the product. The structure of the obtained product (III) having boiling point of 155°–156° C. (2 mm Hg) is confirmed by IR and NMR.

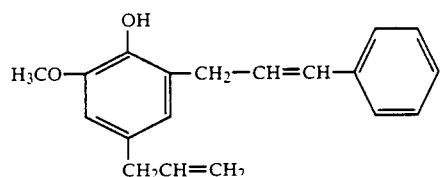

EXAMPLES 4–8

Bis(4-maleimidophenyl)methane/O,O'-Diallylbisphenol A Formulations with Reactive Diluents A mixture of bis(4-maleimidophenyl)methane (a), O,O'-diallylbisphenol A (b) and the reactive diluent of Example 1 (c) is blended at 120°–125° C. for 20–25 minutes until a clear solution is formed. The compositions of each formulation are given in Table 1 along with a control.

TABLE 1

| | Composition, parts by weight (pbw) | | |
|---|---|---|---|
| Example | a | b | c |
| 4 (Control) | 100 | 77 | 0 |
| 5 | 100 | 77 | 17 |
| 6 | 100 | 77 | 34 |
| 7 | 100 | 56 | 14 |
| 8 | 100 | 38 | 29 |

Upon cooling to ambient temperature, transparent glassy solids or semi-solids are formed. The viscosity of the formulations of Examples 4–8 is measured by a Rheometrics RDA 700 Dynamic Spectrometer using oscillating parallel plates (40 mm in diameter) at 1 Hz and a sample height of 0.80 mm. The results are given in Table 2. Gel Time is also measured using a Brabender "Cyclo-Visco-E" gel timer with samples weighing 0.3 g. The gel timer also uses oscillating parallel plates. Gellation is sensed as a large, sharp increase in viscosity.

TABLE 2

VISCOSITY OF THE COMPOSITIONS

| Example | Viscosity, cPs at | | | |
|---|---|---|---|---|
| | 70° C. | 80° C. | 90° C. | 100° C. |
| 4 (Control) | 7,000 | 1,660 | 750 | 350 |
| 5 | 500 | 350 | — | 150 |
| 6 | 280 | 150 | — | 60 |
| 7 | 2,250 | 860 | 300 | 170 |
| 8 | 1,630 | 620 | 250 | 130 |

TABLE 3

GEL-TIME OF THE COMPOSITIONS AT 177° C.

| Example | Gel-Time, Min. |
|---|---|
| 4 | 8.5 |
| 5 | 9.0 |
| 6 | 9.5 |
| 7 | 8.5 |
| 8 | 8.0 |

The compositions of Examples 4-8 are then heated at 90°-100° C. under vacuum (5 mm Hg) for 20-25 min and poured into open-top aluminum molds of size 6"×4"×⅛" and coated with silicone-based mold release agent. The castings are cured according to the following schedule:

1 hour at 180° C.
2 hours at 200° C.
6 hours at 250° C.
in a programmable circulating-air oven.

Cured samples are characterized by Glass Transition Temperature (Tg) using a Perkin Elmer thermal mechanical analyzer in penetration mode at 10° C./minute under nitrogen purge. Thermo-oxidative stability is analyzed by Thermal Gravimetric Analysis (DuPont Model 951/Thermogravimetric Analyzer). Testing is conducted in air at 10° C./min. Water resistance is characterized by water absorption after 4 weeks immersion in water at 71° C. (Samples 2"×½"×⅛" all faces sanded smooth). Results are presented in Tables 4-6.

TABLE 4

Tg OF THE COMPOSITIONS

| Example | Tg(°C.) |
|---|---|
| 4 | 309 |
| 5 | 376 |
| 6 | 372 |
| 7 | 383 |
| 8 | 389 |

TABLE 5

WATER RESISTANCE OF THE COMPOSITIONS

| Example | Water Pick-up,* (%) |
|---|---|
| 4 | 4.67 |
| 5 | 4.47 |
| 6 | 4.05 |
| 7 | 4.54 |
| 8 | 4.65 |

*Four Weeks in Water at 71° C.

TABLE 6

THERMO-OXIDATIVE STABILITY OF THE COMPOSITIONS

| Example | Ti,* (°C.) |
|---|---|
| 4 | 437 |
| 5 | 438 |
| 6 | 440 |
| 7 | 435 |
| 8 | 435 |

*Temperature Corresponding to 5% Weight Loss in TGA (air)

EXAMPLE 9

Bis(4-maleimidophenyl)methane-4-Allyl-2(γ-phenylallyl)-6-Methoxyphenol composition A mixture of 100 pbw of bis(4-maleimidophenyl)methane and 80 pbw of 4-allyl-2-(γ-phenylallyl)-6-methoxyphenol is blended at 125°-130° for 25 minutes until a clear solution is formed. The mixture has a viscosity of 125 cPs at 100° C. and gel time 9.5 min at 177° C. After curing (1 hour at 180° C., 2 hours at 200° C. and 5 hours at 250° C.) the composition has a Tg of 369° C., Ti of 441° C. (TGA) and water absorption of 4.1% (after 4 weeks immersion in water at 71° C.).

What is claimed is:

1. A substituted diallylphenol of the formula (I)

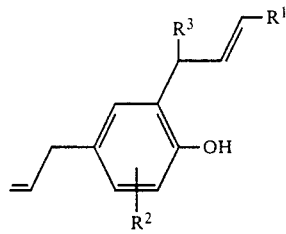

wherein $R^1$ is hydrogen, $C_1-C_{20}$alkyl or aryl, $R^2$ is $C_1-C_{20}$alkyl, aryl or $OR^4$ wherein $R^4$ is $C_1-C_{20}$alkyl or aryl and $R^3$ is hydrogen, $C_1-C_{20}$alkyl or aryl with the proviso that when $R^2$ is methoxy, one of $R^1$ and $R^3$ is not hydrogen.

2. A substituted diallylphenol according to claim 1 wherein $R^1$ is hydrogen.

3. A substituted diallylphenol according to claim 2 wherein $R^1$ is phenyl.

4. A substituted diallylphenol according to claim 1 wherein $R^2$ is $-OR^4$.

5. A substituted diallylphenol according to claim 4 wherein $R^2$ is $-OR^4$ and $R^4$ is $C_1-C_4$-alkyl.

6. A substituted diallylphenol according to claim 5 wherein $R^2$ is $-OR^4$ and $R^4$ is methyl.

7. A substituted diallylphenol according to claim 1 being 4-allyl-2-α-phenylallyl-6-methoxyphenol.

8. A substituted diallylphenol according to claim 1 being 4-allyl-2-(γ-phenylallyl)-6-methoxyphenol.

9. A curable formulation comprising one or more bismaleimides and at least one substituted diallylphenol of the formula I

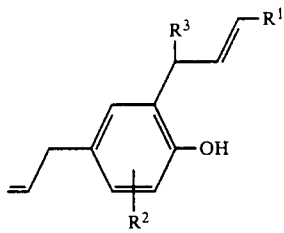

wherein $R^1$ is hydrogen, $C_1$-$C_{20}$alkyl or aryl; $R^2$ is $C_1$-$C_{20}$alkyl; aryl or $OR^4$ wherein $R^4$ is $C_1$-$C_{20}$alkyl or aryl and $R_3$ is hydrogen, $C_1$-$C_{20}$alkyl or aryl.

10. A curable formulation according to claim 9 wherein said bismaleimide is bis(4-maleimidophenyl)methane.

11. A curable formulation according to claim 9 wherein said bismaleimides are present in an amount ranging from about 50-60 parts by weight.

12. A curable formulation according to claim 9 wherein said substituted diallylphenol is present in an amount ranging from about 1 to about 50 parts by weight.

13. A curable composition according to claim 9 wherein said substituted diallyl is present in an amount ranging from about 5 to about 25 parts by weight.

14. A curable composition according to claim 9 wherein said substituted diallylphenol is 2,4-diallyl-6-methoxyphenol.

15. A curable composition according to claim 9 wherein said substituted diallylphenol is 4-allyl-2-α-phenylallyl-6-methoxyphenol.

16. A curable composition according to claim 9 wherein said substituted diallylphenol is 4-allyl-2(γ-phenylallyl)-6-methoxyphenol.

17. A curable composition according to claim 9 further comprising a thermoplastic polymer.

18. A curable composition according to claim 9 further comprising additional reactive diluents and modifiers.

19. A curable composition according to claim 9 further comprising one or more vinyl polymerization initiators.

20. A curable composition according to claim 18 wherein said additional reactive diluent is O,O'-diallyl bisphenol A.

* * * * *